(12) United States Patent
Michel et al.

(10) Patent No.: US 8,337,969 B2
(45) Date of Patent: Dec. 25, 2012

(54) LINER AND ALSO THE USE THEREOF

(75) Inventors: Uwe Michel, Berlin (DE); Bernhard Müssig, Seevetal (DE)

(73) Assignee: Tesa SE, Hamburg (DE)

( * ) Notice: Subject to any disclaimer, the term of this patent is extended or adjusted under 35 U.S.C. 154(b) by 346 days.

(21) Appl. No.: 12/356,938

(22) Filed: Jan. 21, 2009

(65) Prior Publication Data

US 2009/0186182 A1   Jul. 23, 2009

(30) Foreign Application Priority Data

Jan. 22, 2008  (DE) .......................... 10 2008 005 560

(51) Int. Cl.
*B32B 9/00* (2006.01)
*B32B 33/00* (2006.01)

(52) U.S. Cl. ...................... 428/40.1; 428/41.4; 428/41.5

(58) Field of Classification Search .............. 428/40.1, 428/41.4, 41.5, 41.8
See application file for complete search history.

(56) References Cited

U.S. PATENT DOCUMENTS

| | | | |
|---|---|---|---|
| 4,725,630 A | 2/1988 | Magee et al. | |
| 5,866,222 A * | 2/1999 | Seth et al. | 428/41.4 |
| 6,361,844 B1 * | 3/2002 | Ou-Yang | 428/41.5 |
| 6,521,312 B1 | 2/2003 | Keiser | |
| 2003/0195300 A1 | 10/2003 | Stevens et al. | |

FOREIGN PATENT DOCUMENTS

| | | |
|---|---|---|
| DE | 33 16 166 | 11/1983 |
| DE | 38 20 294 | 10/1989 |
| DE | 101 45 229 | 12/2004 |
| EP | 0 168 713 | 1/1986 |
| EP | 0 378 420 | 7/1990 |
| EP | 0 962 315 | 12/1999 |
| EP | 1 967 563 | 9/2008 |
| WO | 2008 077883 | 7/2008 |

OTHER PUBLICATIONS

"Standard test methods for flexural properties of unreinforced and reinforced plastics and electrical insulating materials"; ASTM International Standard, Designation: D 790-03 XP001248019 (Jan. 1, 2003).
Ullmann's Encyclopedia of Industrial Chemistry, Plasts, Additives (pp. 43-44) (2008) (Website: mrw.interscience.wiley.com).

* cited by examiner

*Primary Examiner* — Patricia Nordmeyer
(74) *Attorney, Agent, or Firm* — Norris McLaughlin & Marcus PA

(57) ABSTRACT

Liner comprising a film which comprises oriented polypropylene having a flexural modulus of at least 1400, preferably at least 2000 MPa, a release coating being applied on at least one of the two outer sides of the film.

9 Claims, No Drawings

LINER AND ALSO THE USE THEREOF

The invention relates to a liner and also to the use thereof.

Adhesive tapes coated on one or both sides with adhesives are usually, at the end of the production operation, wound to a roll in the form of an Archimedean spiral. In order to prevent the adhesives of double-sided adhesive tapes coming into contact with one another, or in order to prevent the adhesive of single-sided adhesive tapes from sticking to the carrier, the adhesive tapes, prior to winding, are applied to a liner material, which is wound up together with the adhesive tape. The skilled person refers to such liner materials simply as liners. As well as for the lining of single-sided or double-sided adhesive tapes, liners are also used to line labels.

Generally speaking, liners are release papers (papers with single-sided or double-sided silicone coating). Also used, to a minor extent, are polyester, polypropylene and polyethylene films with a silicone coating. Film-based liners are referred to by the skilled person for self-adhesive products as release films.

The films for polyolefin liners of this kind are produced by blown-film or flat-film extrusion. Liners serve for the production operation (coating of pressure-sensitive adhesive, drying, transfer of the dry adhesive to a substrate, and removal of the liner). The liner may also serve for storage (for example in the case of double-sided adhesive tapes) or for further processing (for example in the case of labels). The liner lines the layer of pressure-sensitive adhesive and is removed in application prior to bonding.

For this purpose it is advantageous if the liner has a high stiffness. In the case of narrow, double-sided adhesive tapes (in a width of 5 mm for example), the liner also serves as a protection against overstretch during application, so that the adhesive tape in the adhered state does not detach again as a result of contraction. Release papers have excellent properties in this respect, but are not dimensionally stable in the event of fluctuations in humidity. Furthermore, after the diecutting operation, paper fibres originating from the release paper adhere to the cut edges of the adhesive tape, which is unacceptable for hygiene applications and electronics applications of the diecut, examples being diecuts for the assembly of flat screens or mobile telephones.

Polyester films are obtainable virtually only as colourless films, which makes it difficult for the end user to recognize the liner. The liners made from extruded polyolefin films are soft and flexible, and are therefore used for the application of pressure-sensitive adhesive products to uneven surfaces. As a disadvantage, they possess a low tensile modulus, and can therefore be used neither for direct coating with adhesive nor for lining narrow adhesive tapes.

Liners serve to mask a layer of pressure-sensitive adhesive prior to its adhesive bonding, at application; a liner, therefore, is an auxiliary means, which must be disposed of after it has been removed from the layer of pressure-sensitive adhesive. The same applies to a release film, which represents a special case of a liner (when the release is applied to a film). Carriers are fundamentally different from liners, since carriers are a permanent part of an adhesive tape or label. Carriers are always firmly connected to the layer of pressure-sensitive adhesive (directly or through an adhesion promoter, also called primer). Similar comments also apply to the distinction between a release film and the carrier of a film-based adhesive tape.

It is an object of the invention to provide a liner which does not have the stated disadvantages of release papers, which has a high tensile modulus in machine direction, and which can also be produced with colouring.

This object is achieved by means of a liner as described in greater detail hereinbelow. Further embraced by the concept of the invention is the use of the liner of the invention.

The invention accordingly provides a liner comprising a film which comprises oriented polypropylene having a flexural modulus of at least 1400, preferably at least 2000 MPa, a release coating being applied on at least one of the two outer sides of the film.

In order to achieve high tensile strengths, high stresses at 1% and 10% extension, and high tear propagation resistance, the conditions of the drawing operation ought to be selected such that the draw ratio is the maximum which can be technically realized for the film. In accordance with the invention the draw ratio in machine direction is at least 1:8, preferably at least 1:9.5.

A draw ratio of 1:6, for example, indicates that a section of the primary film 1 m in length produces a section 6 m long in the drawn film. The draw ratio is often also designated as the ratio of the linear speed prior to orientation to the linear speed after orientation.

In order, furthermore, to achieve maximum values for stresses at 1% and 10% extension, and for tensile strength and tear propagation resistance, it is advantageous to use nucleating agent. Suitable nucleating agents ($\alpha$ or $\beta$ crystals) are all of those which are suitable for polypropylene. These are organic nucleating agents such as, for example, benzoates, phosphates or sorbitol derivatives. Nucleating agents of this kind are described for example in Section "9.1. Nucleating Agents" in Ullmann's Encyclopaedia of Industrial Chemistry (2002 Edition from Wiley-VCH, Article Online Posting Date Jun. 15, 2000) or in the examples of US 2003/195300 A1. A further particularly suitable method is the use of a semicrystalline branched or coupled polymeric nucleating agent, as described in US 2003/195300 A1, an example being a polypropylene modified with 4,4'-oxydibenzenesulfonyl azide.

Monoaxially oriented polypropylene films comprising PP copolymers having a flexural modulus of 1100 to 1300 MPa, or comprising mixtures of PP homopolymers and polyethylene, are matt and cloudy. It is true that the skilled person is aware that nucleating agent can improve the transparency of unoriented articles made from polypropylene, but, surprisingly, an oriented film made from the polypropylene of the invention, if the nucleating agent is distributed homogeneously, is glass-clear, while it is a mother-of-pearly white if the distribution is inhomogeneous. The latter is most readily achieved by extruding a mixture of pellets of non-nucleated polypropylene with homogeneously nucleated polypropylene; in that case, orientation is vital to achieving the effect.

In a further preferred embodiment of the invention the liner possesses a stress at 1% extension of at least 20, preferably at least 40 $N/mm^2$ and/or a stress at 10% extension of at least 250, preferably at least 300 $N/mm^2$, in machine direction (longitudinal direction). According to a further preferred embodiment, the tensile strength is at least 300, preferably at least 330 $N/mm^2$ and/or the tear propagation resistance in cross direction is at least 80, more particularly at least 220 N/mm. To calculate strength values, the force values relative to width are divided by the thickness. The thickness of the film is preferably between 25 and 200 µm, more preferably between 40 and 140 µm, very preferably between 50 and 90 µm.

The film for the liner of the invention can be produced in a way which is similar to the relatively simple extrusion process for monoaxially oriented polypropylene films. Films of that kind are used as carrier material for tear-open strips or strapping tapes. They are produced from PP copolymers having a flexural modulus of 1100 to 1300 MPa or from mixtures of PP homopolymers and polyethylene, in order to give the carrier film high longitudinal strength, but also high toughness. The draw ratio is typically 1:6. These carrier films are coated on one side with a pressure-sensitive adhesive, preferably with use of a primer.

A liner, in contrast, is not a constituent of an adhesive tape or label, but instead is only an auxiliary means for the production or storage of the tape or label or for its further processing by diecutting. Furthermore, unlike a carrier, a liner is not joined firmly to a layer of adhesive. The liner of the invention is different not only by virtue of its intended use from a monoaxially oriented polypropylene carrier film, but also through the hardness (expressed as flexural modulus) of the polypropylene base material. The film of the invention is manufactured from polypropylene having a flexural modulus of at least 1400, preferably at least 2000 MPa and, furthermore, is oriented to a greater extent.

According to a further advantageous embodiment, a release coating is applied on both outer sides of the film, the release coatings preferably having different release forces with respect to a layer of adhesive.

Suitable PP film base materials for the film of the liner of the invention are commercially available polypropylene homopolymers or polypropylene copolymers. For the subject matter of the invention it is preferred to use polypropylene homopolymers.

The melt indices of the stated polymers must be situated in the range suitable for flat-film extrusion. This range ought to be between 0.3 and 15 g/10 min, preferably in the range of 0.8 and 5 g/10 min (measured at 230° C./2.16 kg). The polypropylene is preferably of predominantly isotactic construction.

The film may comprise further polymers, polyethylene for example, including ethylene copolymers such as EVA or LLDPE or noninventive polypropylenes, including the copolymers of polypropylene with ethylene or butylene.

The polymers may be used in pure form or in a blend with additives such as antioxidants, light stabilizers, anti-blocking agents, lubricants, processing assist-ants, fillers, dyes, pigments, blowing agents or nucleating agents, in as-supplied form or in batch form, subject to the proviso that these additives do not negatively influence the curing of a silicone layer.

The film is preferably coloured.

In the case of coating with a solvent-containing release, the film may become brittle. Fibres may be detached from the surface by friction. In accordance with one further advantageous embodiment of the invention, therefore, the film, on at least one of the two outer sides, has a coextrusion layer comprising a polypropylene polymer or an ethylene-containing polymer having a crystallite melting point of below 150° C., preferably below 140° C., the coextrusion layer being disposed if desired between the film and the release coating.

The fraction of such polymers with relatively low crystallinity (and, usually associated therewith, relatively low crystallite melting point) is preferably at least 50% by weight. Examples are random PP copolymers, PP terpolymers, PP plastomers (for example Vistamaxx® or Versify®), PE plastomers (for example Exact® or Tafmer®), EPM, EPDM, LDPE, VLDPE or LLDPE. Where the polymer of the coextrusion layer contains little or no propylene, it is blended, in order to improve the adhesion between film and coextrusion layer, preferably with a polypropylene-containing polymer, more particularly the main component of the film, the fraction being preferably at least 20% by weight.

According to a further advantageous variant of the invention, the film, on at least one of the two outer sides, has a coextrusion layer comprising a polypropylene polymer having an olefinic comonomer content of less than 2.5% by weight, preferably 0% by weight, the coextrusion layer preferably being free from nucleating agent and the coextrusion layer being disposed if desired between the film and the release coating.

Surprisingly, despite high crystallinity, polypropylene polymers having an olefinic comonomer content of less than 2.5% by weight, preferably 0% by weight (the latter implying that a polypropylene homopolymer is present), are suitable for such a coextrusion layer, particularly when the coextrusion layer is free of nucleating agent.

The thickness of the coextrusion layer(s) is not more than 20%, preferably not more than 10%, of the total film thickness.

The liner of the invention is equipped on the outer side of the coextrusion layer with a release coating (non-stick coating).

According to a further advantageous embodiment of the invention it is possible for there to be a release coating applied to both outer sides of the carrier. Release coatings may be composed of silicones, acrylates (for example Primal® 205), stearyl compounds such as polyvinyl stearylcarbamate or chromium stearate complexes (for example, Quilon® C), reaction products of maleic anhydride copolymers and stearyl amine, or reaction products of polyvinyl alcohol and stearyl isocyanate.

Preference is given to a silicone-based release coating. The silicone may be applied solventlessly (in 100% form or as a dispersion), or on a solvent-borne basis and may be crosslinked by radiation, thermally for example, via a condensation, addition or free-radical reaction, or physically (for example, by virtue of a block structure).

If desired, the release coating may also be applied by coextrusion (for example with an external layer comprising polyvinyl stearylcarbamate or silicone-grafted polyethylene).

Preferably there are silicone layers applied to both sides of the liner film, and with particular preference these silicone layers have different release forces with respect to a layer of adhesive.

In order to avoid adverse effects of the release coating on the mechanical properties of the film, solvent-free silicones with thermal or radiation-induced crosslinking are particularly preferred, especially vinylpolydimethylsiloxanes. These silicones are preferably crosslinked with methylhydrosiloxanes in the presence of a platinum or rhodium catalyst or by EB/UV radiation.

For this purpose it is possible to use, for example, the commercially available, addition-crosslinking silicone release system "Dehesive 940A" from Wacker-Chemie with an associated catalyst system, which is applied in the non-crosslinked state and then subsequently, in the applied state, undergoes crosslinking.

As crosslinkable silicone it is possible to employ the silicone systems that are customarily used for release coating. These include mixtures of crosslinking catalysts and what are called thermally curable condensation-crosslinking or addition-crosslinking siloxanes. It is also possible, furthermore, to use photoactive catalysts, known as photoinitiators, in combination with UV-curable, cationically crosslinking epoxide-based and/or vinyl ether-based siloxanes, and/or UV-curable, free-radically crosslinking siloxanes such as, for instance, acrylate-modified siloxanes. A further possibility is the use of electron beam curable silicone acrylates. Depending on their intended use, such systems may also comprise further additions such as stabilizers or flow control assistants.

Furthermore, there are different kinds of organopolysiloxane compositions known which crosslink by heating or irradiation. Mention may be made of compositions of the kind described, for example, in EP 0 378 420 A1 which crosslink by addition reaction, namely by the temperature treatment of a mixture comprising organopolysiloxane with hydrogen atoms attached directly to the silicon atoms and an organopolysiloxane having vinyl groups attached directly to the silicon atoms, in the presence of a hydrosilylation catalyst.

Photopolymerizable organopolysiloxane compositions can be used as well. Examples include compositions which are crosslinked through the reaction between organo-polysiloxanes which have hydrocarbon radicals, substituted by (meth)acrylate groups, attached directly to the silicon atoms, this crosslinking taking place in the presence of a photosensitizer (see EP 0 168 713 B1, DE 38 20 294 C1). It is likewise possible to use compositions where the crosslinking reaction between organopolysiloxanes which have mercapto-substituted hydrocarbon attached directly to the silicon atoms and organopolysiloxanes having vinyl groups attached directly to the silicon atoms is brought about in the presence of a photosensitizer. Such compositions are described in U.S. Pat. No. 4,725,630 A1, for example.

In the case where the organopolysiloxane compositions described in DE 33 16 166 C1 are used, which have epoxy-substituted hydrocarbon radicals attached directly to the silicon atoms, the crosslinking reaction is induced by the release of a catalytic quantity of acid which is obtained through the photodecomposition of added onium salt catalysts. Other organopolysiloxane compositions curable by means of a cationic mechanism are materials which have, for example, propenyloxysiloxane end groups.

Thermosetting release coatings are frequently multi-component systems which are composed typically of the following components:

a) A linear or branched dimethylpolysiloxane which is composed of about 80 to 200 dimethylpolysiloxane units and is stopped at the chain ends with vinyldimethylsiloxy units. Typical representatives are, for example, solvent-free, addition-crosslinking silicone oil with terminal vinyl groups, such as Dehesive® 921 or 610, both commercially available from Wacker-Chemie GmbH.

b) A linear or branched crosslinker which is composed customarily of methylhydrosiloxy and dimethylsiloxy units, the chain ends being satisfied either with trimethylsiloxy groups or dimethylhydrosiloxy groups. Typical representatives of this class of product are, for example, hydropolysiloxanes having a high reactive Si—H content, such as the crosslinkers V24, V90 or V06 available commercially from Wacker-Chemie GmbH.

c) A silicone MQ resin which as its M unit has vinyldimethylsiloxy units as well as the trimethylsiloxy units customarily used. Typical representatives of this group are, for example, the release-force regulators CRA® 17 or CRA® 42, available commercially from Wacker-Chemie GmbH.

d) A silicone-soluble platinum catalyst such as, for example, a platinum divinyltetramethyldisiloxane complex which is customarily referred to as the Karstedt complex and is available commercially, for example, under the name Katalysator OL from Wacker-Chemie GmbH.

The silicones used in accordance with the invention, preferably silicone oils, are polydisperse mixtures of linear or cyclic siloxane chains of different lengths and with different substitution. The mixtures are formed in catalysed synthesis processes. The polysiloxanes are composed of alternating atoms of silicon and oxygen, and so the characteristic feature is the Si—O—Si (=siloxane) bond in the molecular assembly. On the two remaining valencies of the silicon, a variety of substituents are possible.

Given their chemically correct name, therefore, the silicone oils in question are polydimethylsiloxanes, generally abbreviated to PDMS. They are characterized by the formula below:

Structure of linear (left) and cyclic (right) polydimethylsiloxanes

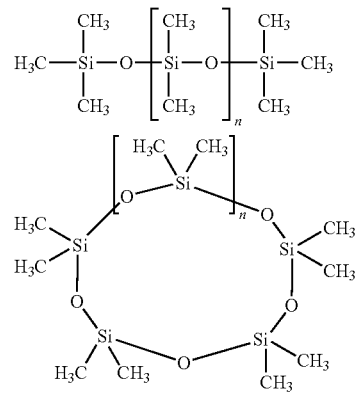

The radicals on the silicon may also be satisfied with further siloxane bonds; in this way, branched silicones and crosslinked silicones are formed. The former then form the silicone resins, the latter the silicone elastomers.

Depending on the functionality of the silicon group (mono-, di-, tri- or tetra-functional) the symbolic notations M, D, T and Q have been introduced:

[M]=$R_3SiO_{1/2}$
[D]=$R_2SiO_{2/2}$
[T]=$RSiO_{3/2}$
[Q]=$SiO_{4/2}$

The following groups can be distinguished:

linear polysiloxanes: are constructed in chain form from difunctional siloxane units and contain monofunctional end groups; structural type [MD$_n$M] or $R_3SiO[R_2SiO]_n$ SiR$_3$, in the pictorial formula (R=CH$_3$).

branched polysiloxanes: are constructed in cyclic or chain form from di-, tri- or tetra-functional siloxane units; structural type [M$_n$D$_m$T$_n$].

cyclic polysiloxanes: are constructed in cyclic form from difunctional siloxane units; structural type [D$_n$].

crosslinked polymers: are chain-form or cyclic molecules which are linked via T and Q units to form two-dimensional or three-dimensional networks.

The side of the film that is intended to have a release coating is preferably pretreated on the surface for the purpose of better adhesion of the release coating. These pre-treatments may be chemical coatings or treatments from the gas phase (for example, fluorine-containing gases), or physical operations such as fluorine treatment, flame treatment or plasma treatment and, in particular, corona treatment; if appropriate, mechanical pretreatment (embossing) is also possible.

Owing to the outstanding properties of the liner, it is possible with advantage to use a single-sided or double-sided adhesive tape, adhesive-tape diecut or label to line the adhesive layer, particularly when the adhesive coating is acrylate-based.

The single-sided or double-sided adhesive tape, the adhesive-tape diecuts or labels may further comprise a carrier, for example, a tissue, a film, a woven fabric, a polyolefin foam or a nonwoven. Preferably, the adhesive tape is double-sidedly adhesive and preferably comprises a carrier made from thin paper (tissue), nonwoven, foam material or film. The films may be, for example, biaxially oriented polyester or polypropylene films.

In a further advantageous use of the liner it lines a double-sided adhesive tape which is processed to diecuts in a diecutting process.

For the purposes of this invention the general expression "adhesive tape" encompasses all sheet-like structures such as two-dimensionally extended films or film sections, tapes with extended length and limited width, tape sections and the like, and finally also diecuts or labels.

Furthermore, the liner may be equipped on both sides with one adhesive coating each side, these adhesive coatings being alike or different in their composition. The thickness of coating with adhesive per side is preferably in the range from 18 to 200 g/m$^2$, more particularly 40 to 120 g/m$^2$.

Suitable pressure-sensitive adhesives are described in D. Satas, Handbook of Pressure Sensitive Adhesive Technology (Van Nostrand Reinhold). Suitability is possessed more particularly by pressure-sensitive adhesives based on acrylate, natural rubber, thermo-plastic styrene block copolymer, polyisobutylene or silicone. Preference is given to acrylate PSAs, which may be applied as a dispersion, hotmelt or solution. To optimize the properties the self-adhesive composition employed may have been blended with one or more additives such as tackifiers (resins), plasticizers, fillers, pigments, UV absorbers, light-stabilizers, ageing inhibitors, crosslinking agents, crosslinking promoters or elastomers. The layer of adhesive may be crosslinked as a result of heat or high-energy beams.

The liner of the invention has a high tensile modulus in machine direction, and so narrow adhesive tapes cannot be overstretched on application. Furthermore, it can also be produced with colouring. The liner has sufficient temperature stability to allow coats of adhesive applied to it to be dried. The liner has a high tear propagation resistance in cross direction, and so if the edges are damaged it does not tear off easily, as is the case with a normal oriented film made, for example, of polypropylene or polyester.

All of the parameters mentioned are determined by the following test methods:

Thickness: DIN 53370

Tensile strength: DIN 53455-7-5 in machine direction

Stress at 1% or 10% extension: DIN 53455-7-5 in machine direction

Breaking extension: DIN 53455-7-5 in machine direction

Melt index: DIN 53735

The "melt flow ratio" (MFR) melt index is measured in accordance with DIN 53735. For polyethylenes, melt indices are usually stated in g/10 min at 190° C. under a weight of 2.16 kg, and for polypropylenes accordingly, albeit at a temperature of 230° C.

Flexural modulus: ASTM D 790 A

Density: ASTM D 792

Crystallite melting point: Determination by DSC to ISO 3146 or MTM 15902 (Basell method)

The purpose of the text below is to illustrate the invention with reference to examples, without restricting it as a result.

EXAMPLES

Raw Materials

Dow 7C06:
PP-BC, MFI 1.5 g/10 min, non-nucleated, flexural modulus 1280 MPa, crystallite melting point 164° C. (Dow Chemical)

Dow Inspire 404.01:
Polypropylene, MFI 3 g/10 min, nucleated (with a polymeric nucleating agent as per US 2003/195300 A1), flexural modulus 2068 MPa, crystallite melting point 164° C. (Dow Chemical)

Dowlex 2032:
LLDPE, MFI 2.0 g/10 min, density 0.9260 g/cm$^3$, crystallite melting point 124° C. (Dow Chemical)

Remafingelb HG AE 30:
Coloured PP masterbatch with translucent pigment (Clariant Masterbatches)

Dehesive 914:
Vinylpolydimethylsiloxane (Wacker Silicones)

Crosslinker V24:
Methylhydropolysiloxane (Wacker Silicones)

Catalyst OL:
Platinum catalyst in polydimethylsiloxane (Wacker Silicones)

SL 6670:
Vinylpolydimethysiloxane with platinum catalyst (GE Silicones)

SS 4300 C:
Methylhydropolysiloxane (GE Silicones)

Example 1

A three-layer film carrier is coextruded on a single-screw coextrusion unit with a flat die having a flexible die lip, followed by a chill roll station and a single-stage short-gap drawing unit. The (core) film is composed of 99% by weight Inspire D 404.01 and 1% by weight Remafingelb HG AE 30, while the two outer coextrusion layers are composed of 70% by weight Dowlex 2032 and 30% by weight Dow 7C06. The die temperature is 235° C. Chill roll temperatures and drawing roll temperatures are set such that the crystallinity of the film carrier before and after the drawing operation is as high as possible. The draw ratio is 1:10.

| Film properties: | |
| --- | --- |
| Carrier thickness after drawing | 80 μm |
| Thickness of the base layer | 70 μm |
| Thickness of the coextrusion layers, each | 5 μm |
| Stress at 1% extension | 65 N/mm$^2$ |
| Tensile strength | 305 N/mm$^2$ |
| Breaking extension | 8% |
| Tear propagation resistance | 410 N/mm |

The film carrier is corona-pretreated on both sides and coated, using a multiple-roll applicator unit, with a mixture of 96.5 parts by weight of Dehesive 914, 2.5 parts by weight of Crosslinker V24 and 1 part by weight of Catalyst OL, and is subsequently cured in a heating tunnel. The resulting liner is highly transparent and yellow in colour.

The adhesive is mixed in the melt from 42% by weight of SIS elastomer, 20% by weight of a pentaerythritol ester of hydrated rosin, 37% by weight of a C$_5$ hydrocarbon resin having an R&B value of 85° C. and 1% by weight of Irganox® 1010 antioxidant, and the melt is applied at 150° C., using a die, to a release paper, at 50 g/m², and then transferred to the liner by lamination. Subsequently the adhesive tape is wound to form a mother roll, and slit.

Example 2

A film carrier is produced on a single-screw extrusion unit with a flat die having a flexible die lip in one layer, followed by a chill roll station and a single-stage short-gap drawing unit.

Inspire D 404.01 and Dow 7C06 are mixed in a ratio of 1:1 and extruded. The die temperature is 235° C. Chill roll temperatures and drawing roll temperatures are set such that the crystallinity of the film before and after the drawing operation is as high as possible. The draw ratio is 1:10.

| Film properties: | |
|---|---|
| Carrier thickness after drawing | 80 μm |
| Stress at 1% extension | 43 |
| Stress at 10% extension | 340 |
| Tensile strength | 373 N/mm² |
| Breaking extension | 22% |
| Tear propagation resistance | 520 N/mm |

The film carrier is corona-pretreated on both sides, coated, using a multiple-roll applicator unit, with a mixture of 96.8 parts by weight of SL 6670 and 3.2 parts by weight of SS 4300 C, and is subsequently cured in a heating tunnel. The resulting liner is mother-of-pearly white.

The liner is coated with an acrylate hotmelt adhesive as per Example 6 of DE 101 45 229 A1, the coatweight being 100 g/m², and then a corona-pretreated polyester film 10 μm thick is laminated in and the assembly is wound to a roll. In a second operation this stock material is unwound and coated again in the same way, but this time on the uncoated polyester side, after which it is wound to form a mother roll, and slit.

Comparative Example 1

The film carrier is produced by siliconization as per Example 1, but on a biaxially oriented polypropylene film 35 μm thick. The draw ratio in machine direction is 1:5 and the draw ratio transverse to the machine direction is 1:9.

| Film properties: | |
|---|---|
| Carrier thickness | 35 μm |
| Stress at 1% extension | 24 N/mm² |
| Tensile strength | 115 N/mm² |
| Breaking extension | 215% |
| Tear propagation resistance | 90 N/mm |

The adhesive tape, in analogy to Example 1, is colourless, and therefore the liner on the layer of adhesive cannot be recognized. Applied in a width of 5 mm as a closure to polyethylene pouches, overstretch occurs at relatively high application rates. This leads to creases in the pouches as a result of contraction in the bonding region. In isolated instances, tears occur in the course of application.

These problems do not occur in the case of Examples 1 and 2.

Comparative Example 2

Release film based on polyethylene (76677 easy tight, colour 94333 from Huhtamaki).

| Film properties: | |
|---|---|
| Carrier thickness | 100 μm |
| Stress at 1% extension | 12 N/mm² |
| Stress at 10% extension | 29 N/mm² |
| Tensile strength | 51 N/mm² |
| Breaking extension | 800% |
| Tear propagation resistance | 1200 N/mm |

The adhesive tape is produced as per Example 2, the release film being deformed by the melt and, when the machine is stopped, tearing off on the die as a result of film melting.

Comparative Example 3

The film is produced in the same way as in Example 2, but only Dow 7C06 is used as a base material, and the draw ratio is reduced to 1:6.1. This film corresponds to the carrier of a typical adhesive strapping tape.

| Film properties: | |
|---|---|
| Carrier thickness after drawing | 80 μm |
| Tensile strength | 247 N/mm² |
| Stress at 1% extension | 19 N/mm² |
| Stress at 10% extension | 142 N/mm² |
| Breaking extension | 27% |
| Tear propagation resistance | 170 N/mm |
| Colour | colourless, slightly cloudy |

What is claimed is:

1. Liner comprising a nucleated film which comprises monoaxially oriented polypropylene having a flexural modulus of at least 1400 and a release coating being applied on at least one of the two outer sides of the film, wherein the film has a draw ratio of at least 1:8, a tensile strength in machine direction of at least 300, a stress in machine direction at 1% extension of at least 20 and/or a stress at 10% extension of at least 250.

2. Liner according to claim 1, wherein the film has a thickness of between 25 and 200 μm.

3. Liner according to claim 1, wherein a release coating is applied on both outer sides of the film, the release coating optionally having different release forces with respect to a layer of adhesive.

4. Liner according to claim 1, wherein the film, on at least one of the two outer sides, has a coextrusion layer comprising a polypropylene polymer or an ethylene-containing polymer having a crystallite melting point of below 150° C., the coextrusion layer being disposed optionally between the film and the release coating.

5. Liner according to claim 1, wherein the film, on at least one of the two outer sides, has a coextrusion layer comprising a polypropylene polymer having an olefinic comonomer content of less than 2.5% by weight, the coextrusion layer optionally being free from nucleating agent and the coextrusion layer being disposed optionally between the film and the release coating.

6. Liner according to claim 1, wherein the film is coloured.

7. Liner according to claim 1, wherein the release coating is a silicone layer.

8. A combination comprising a liner according to claim 1 applied to an adhesive layer of a single-sided or double-sided adhesive tape, adhesive-tape diecut or label.

9. Combination according to claim 8, wherein the adhesive coating is acrylate-based.

* * * * *